(12) United States Patent
Silva et al.

(10) Patent No.: US 8,756,666 B1
(45) Date of Patent: Jun. 17, 2014

(54) GENERATING AUTHENTICATION CODES

(75) Inventors: Eric A. Silva, Somverville, MA (US);
William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1212 days.

(21) Appl. No.: 12/241,166

(22) Filed: Sep. 30, 2008

(51) Int. Cl.
*G06F 21/00* (2013.01)

(52) U.S. Cl.
USPC ...... 726/6; 726/9; 726/27; 713/172; 713/178; 713/184

(58) Field of Classification Search
USPC ............... 713/155, 156, 168, 169, 178, 184; 380/28, 232; 726/6
See application file for complete search history.

(56) References Cited

U.S. PATENT DOCUMENTS

| | | | | |
|---|---|---|---|---|
| 4,720,860 A | * | 1/1988 | Weiss | 713/184 |
| 4,885,778 A | * | 12/1989 | Weiss | 713/184 |
| 7,058,814 B1 | * | 6/2006 | Zimmerman | 713/178 |
| 7,502,933 B2 | * | 3/2009 | Jakobsson et al. | 713/172 |
| 2003/0074595 A1 | * | 4/2003 | Brock et al. | 713/600 |
| 2003/0105964 A1 | * | 6/2003 | Brainard et al. | 713/178 |

FOREIGN PATENT DOCUMENTS

WO     WO 2008053471 A1 * 5/2008

* cited by examiner

*Primary Examiner* — Jason Lee
(74) *Attorney, Agent, or Firm* — Krishnendu Gupta; Jason A. Reyes; Deepika Bhayana (57) ABSTRACT

Authentication codes associated with an entity are generated. A stored secret associated with an entity is retrieved. At a first point in time, a first dynamic value associated with a first time interval is determined. A first authentication code based on the first dynamic value is determined. At a second point in time, a second dynamic value associated with a second time interval is determined. A second authentication code based on the second dynamic value is determined. The first and second authentication codes are derived from the stored secret and the amount of time between the first and second points in time is different from the length of the first time interval.

13 Claims, 10 Drawing Sheets

GENERATING AUTHENTICATION CODES

BACKGROUND OF THE INVENTION

Many computer users and other entities have systems that utilize some form of security. One form of security is to limit access to the system to certain entities by using computer-based authentication. Such computer-based authentication may involve the entity that is seeking authentication transmitting a time-based authentication code and identifying information to a verifier who authenticates the identity of the entity. The verifier typically possesses information that allows it to determine whether or not to authenticate a user. If the verifier receives the correct authentication code and information from the entity, the authentication of the entity is successful. If the received authentication code and information is incorrect, the authentication fails.

SUMMARY OF THE INVENTION

Authentication codes associated with an entity are generated. A stored secret associated with an entity is retrieved. At a first point in time, a first dynamic value associated with a first time interval is determined. A first authentication code based on the first dynamic value is determined. At a second point in time, a second dynamic value associated with a second time interval is determined. A second authentication code based on the second dynamic value is determined. The first and second authentication codes are derived from the stored secret and the amount of time between the first and second points in time is different from the length of the first time interval.

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, the emphasis instead is placed on conveying the concepts of the invention.

FIGS. 4-6B are flowcharts of procedures for use with the embodiments of FIGS. 1-3.

DETAILED DESCRIPTION

In at least one specific implementation of an authentication technique described below, one-time passwords are generated on an event-based device (which may also be time-based) for the purpose of authenticating an entity, wherein the device has the ability to provide more than one password less than one minute apart. In the specific implementation, this is accomplished by a time alteration technique including strategically changing the device's clock-based time indicator, which is used to help determine the password, every time a specified event occurs.

Figure 1:
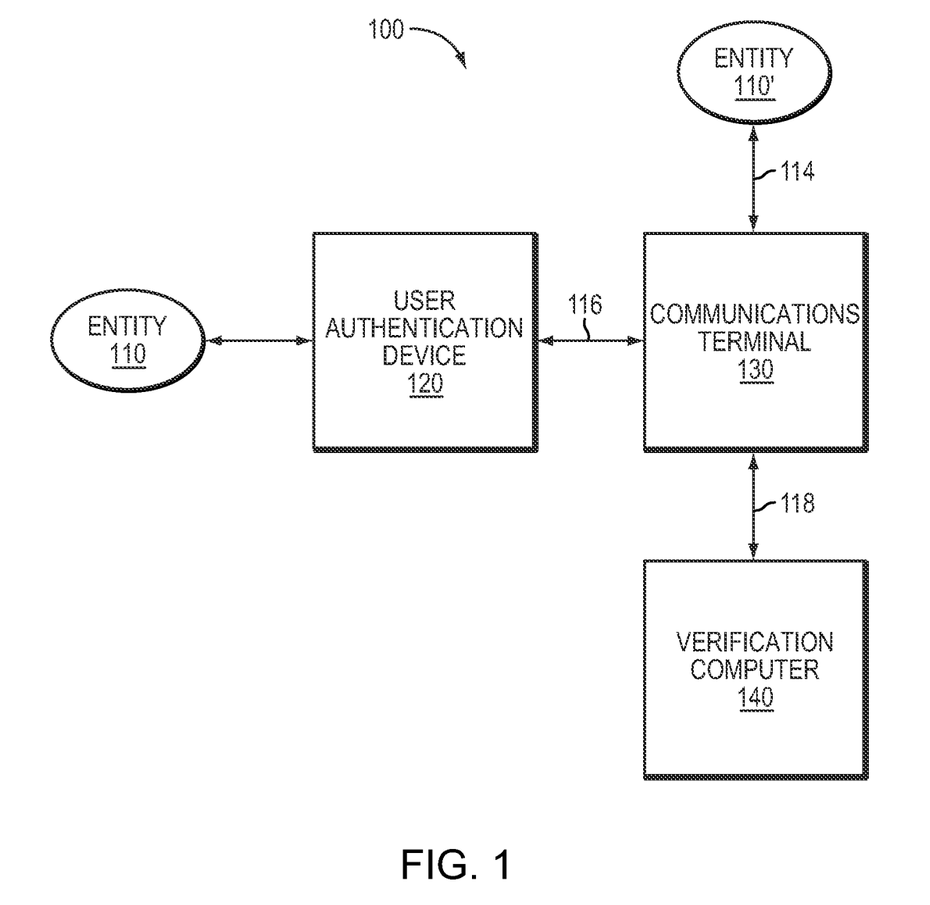
FIGS. 1-3 are diagrams illustrating example embodiments of systems for use in securely authenticating the identity of the user.

Referring to FIG. 1, in one embodiment of a system 100 for use with the authentication technique, a verification computer 140 is used to help authenticate the identity of an entity 110, 110'. The entity 110, 110' is typically a person, but can be any entity requiring authentication in a particular context, including, without limitation, a computer or other device or machine. Authentication can result in the performance of one or more actions including, without limitation, providing access or privileges, taking action, or enabling some combination of the two. Access includes, without limitation: access to a physical location, communications network, computer system, and so on; access to such services as financial services and records, health services and records, and so on; or access to certain levels of information services. In one or more of various embodiments, the entity 110, 110' may be located proximal to or far away from the verification computer 140.

As shown in FIG. 1, entity 110 communicates with an entity authentication device 120. The entity authentication device 120 provides information that contributes to the process of authenticating the entity 110. The entity authentication device 120 may optionally provide a user interface. Communication between the entity 110 and the entity authentication device 120 can take place via this user interface. The user interface can provide an input interface, an output interface, or both. An input interface enables the entity 110 to communicate information to the entity authentication device 120. The input interface can include, without limitation: a keypad or keyboard; one or more push buttons, switches or knobs; a touch sensitive screen; a pointing or pressing device; a trackball; a device for capturing sound, voice or handwriting; a device for capturing biometric input such as a fingerprint, retina or voice characteristic; and so forth. An output interface enables the entity authentication device 120 to communicate information to the entity 110 and can include, without imitation: a visual display to support alphanumeric characters or graphics such as a LCD display, LED display; electrophoretic display; one or more light sources; a sound or voice generator; a vibration interface; and so forth. In some embodiments, the entity 110 provides, via the user interface, identifying information (such as a user identifier, PIN, or password, or biometric characteristic), biological characteristics (such as a fingerprint, retina pattern, or voice sample), or possessions (such as physical keys, digital encryption keys, digital certificates, or authentication tokens) to the entity authentication device 120.

The entity authentication device 120 can have one or more various forms in various implementations, provided that the entity authentication device 120 performs the functions required of the entity authentication device 120 for secure authentication. The entity authentication device 120 can be implemented in packages having a wide variety of shapes and form factors. For example, the entity authentication device 120 can be a credit-card sized and shaped device, or can be much smaller or much larger. One credit-card sized embodiment of the entity authentication device 120 includes a microprocessor, memory, a power source, and a small LCD display. The embodiment optionally includes a keypad or buttons for entry of PIN, request of authentication information, or for other entry or interaction with the device 120. In another embodiment, a credit-card sized device 120 includes a processor that is used as a "smart card." In still other embodiments, a credit-card sized device 120 is a card such as a credit card including a magnetic strip or other data store on one of its sides. In other embodiments, the entity authentication device 120 is a "key fob," that is, a smaller device with a display and battery that is size and shaped to fit on a key ring. In still other embodiments, the entity authentication device 120 is a desktop computer, laptop computer, or personal digital assistant (PDA). For example, the authentication device 120 can be implemented as a software program running on a general-purpose computer, possibly interacting with one or more other computer programs on the same or a different computer.

In still further embodiments the entity authentication device 120 can be a cellular telephone, or specialized hardware embedded in a cellular telephone and adapted to interact with the cellular telephone's circuitry. Other sizes, shapes, and implementations are possible without departing from the spirit of the invention.

In some embodiments, the entity authentication device 120 stores a secret that is used to authenticate the entity 110. In one particular embodiment the stored secret is used to generate an authentication code for the entity 110. The user authentication device 120 may also provide other information, or perform other calculations or combination functions, as described further below. For example, in one embodiment, in addition to storing a secret, the device 120 receives a personally selected secret from the entity 110 (such as a PIN or password) and generates a dynamic, non-predictable authentication code in response to the secret received from the entity 110, the stored secret, and the current time. The entity authentication device 120 optionally may also receive other input, such as an identification code associated with the verification computer, and use that additional information in the generation of the authentication code.

In the embodiment shown in FIG. 1, the entity 110 has indirect access to a communications terminal 130 via the entity authentication device 120. The communications terminal 130 can take one or more various forms, including without limitation: a card reader; a device receptacle, cradle, or holder; a personal computer; a telephone; a personal digital assistant (PDA); a wireless transceiver; and so on. During the authentication process the entity 110, 110' may directly communicate information to only the device 120, only the terminal 130, neither the device 120 nor the terminal 130, or both the device 120 and the terminal 130. Likewise, the communications terminal 130 may receive input from the entity 110, 110' the device 120, or both.

In the embodiment shown in FIG. 1, entity 110' has direct access to the communications terminal 130 via connection 114. Communication between the entity 110' and the communications terminal 130 can take place via a communications terminal user interface 114. Like the device user interface, the communications terminal user interface 114 can include an input interface, an output interface, or both. The input and the output interfaces can take one or more of the forms described above for the device user interface.

The communications terminal 130 can optionally provide a device interface 116 for communications between the terminal 130 and the entity authentication device 120. In one embodiment, this interface can take the form of a wired or wireless communications channel between the terminal 130 and the device 120, using standard or proprietary protocols. For example, in an embodiment in which the device 120 is a smart card and the terminal 130 includes a card reader, the communications interface 116 could be a wired serial communications link between the smart card and the reader. In another embodiment in which the device 120 is a token that has wireless communications capability and the terminal 130 includes a wireless transceiver, the interface 116 could be a wireless link. As another example, in an embodiment in which the card has a magnetic stripe (such as commonly found on a credit card), and the communications terminal 130 includes a magnetic stripe reader, the interface 116 could include the magnetic reader and the standard protocols used to communicate the information from the magnetic stripe on the card when the card is run through the reader.

The communications terminal 130 may provide a user interface 114 without providing a device interface for the device 120. For example, the terminal 130 may be a telephone that the entity 110' uses to communicate authentication information to the verification computer 140. In such an embodiment the entity authentication information may be represented as tones associated with a series of alphanumeric digits. In this embodiment the entity 110' dials a telephone number to establish a communications connection with the verification computer 140 and performs a series of key presses on the telephone to communicate the alphanumeric entity authentication information to the verification computer 140.

The communications terminal 130 communicates information to the verification computer 140 via a communications channel 118. The communications channel 118 may be any method and/or interface that enables communication of information to the verification computer 140 that is required to authenticate the identity of the entity 110. The communications terminal 130 can communicate information generated by the entity 110, 110', the device 120, or both, to the verification computer 140 over a communications channel 118. The communications terminal 130 and the verification computer 140 can implement the communication channel 118 through a variety of connections including standard telephone lines, LAN or WAN links (e.g., T1, T3, 56 kb, X.25), broadband connections (ISDN, Frame Relay, ATM), and wireless connections. Connections between the communications terminal 130 and verification computer 140 can be established using a variety of communication protocols (e.g., TCP/IP, IPX, SPX, NetBIOS, Ethernet, RS23, and direct asynchronous connections). The verification computer 140 processes the information received from the communications terminal 130. The verification computer 140 can perform actions in response to authenticating the identity of the entity 110. For example, the verification computer 140 can grant on-line access to data or physical access to restricted areas or physical items.

In some embodiments, the authentication code communicated over the communications channel 118 is implemented to be different and unpredictable (to an observer without knowledge of the formula used to generate the authentication code) for each user authentication attempt. In certain embodiments this is accomplished by the use of a generation value, as described in U.S. Pat. No. 7,363,494 (the "Generation Value Patent"), which is hereby incorporated herein by reference in its entirety. In other embodiments this is accomplished by the use of time alteration, as described in greater detail below.

For each entity authentication attempt, the verification computer 140 receives entity authentication information and verifies the received information. In some embodiments, the verification computer 140 performs formulaic calculations for each entity authentication attempt that is substantially identical to the formulaic calculation performed by the entity authentication device 120 in order to authenticate the entity 110, 110'. The verification computer 140 compares both copies of authentication information (i.e., the authentication information received over communications channel 118 and the authentication information generated by the verification computer 140) to determine if they match. If a match occurs, then the verification computer 140 authenticates the identity of the entity 110, 110'. If the received and generated entity information do not match, the entity authentication attempt fails. In some embodiments, the verification computer 140 may communicate positive or negative acknowledgement to the communications terminal 130 via the communications channel 118, and the terminal 130 may or may not communicate the acknowledgement to the device 120 or directly to the entity 110, 110'.

In other embodiments, in order to authenticate the entity 110, 110' the verification computer 140 performs a formulaic calculation on a received authentication code that "reverses" the formulaic calculation performed by the entity authentication device 120. In a simplistic example, the entity authentication device 120 generates an authentication code by arithmetically combining a secret stored by the entity authentication device 120 and an entity-supplied PIN. In order to verify the entity 110, 110' in this example, the verification computer retrieves from its records the PIN associated with the entity 110, 110' and the secret stored on the entity's 110, 110' authentication device 120. The verification computer 140 subtracts the entity's 110, 110' PIN from the received authentication code. The verification computer 140 compares the result of the subtraction to the value of the secret stored on the entity's 110, 110' authentication device 120. If they match, the entity 110, 110' is authenticated. If they do not match, entity authentication fails. In certain embodiments the verification computer 140 decrypts a value encrypted by the entity authentication device 120 using symmetric key encryption or asymmetric encryption techniques, such as public key encryption.

Figure 2A:
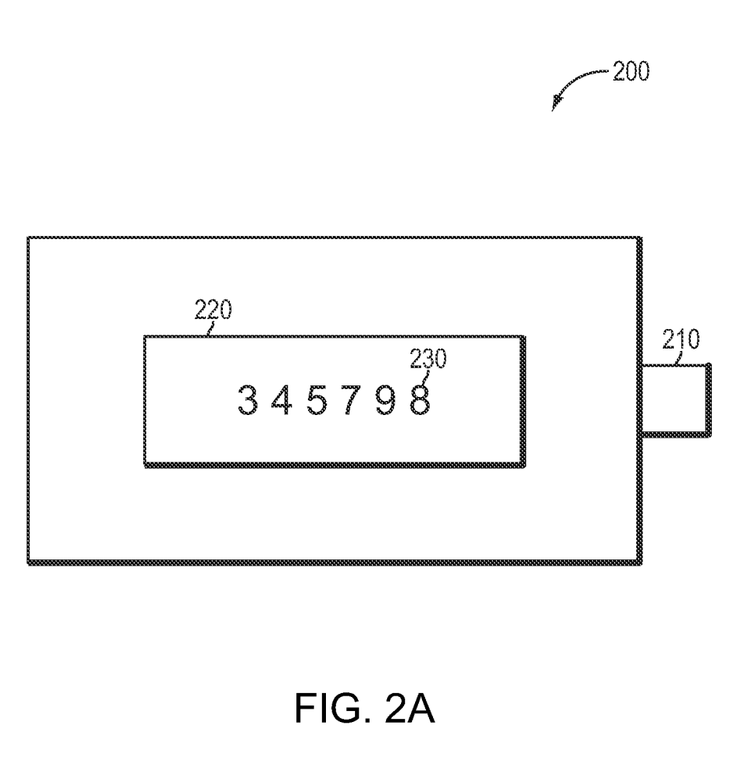
Figure 2B:
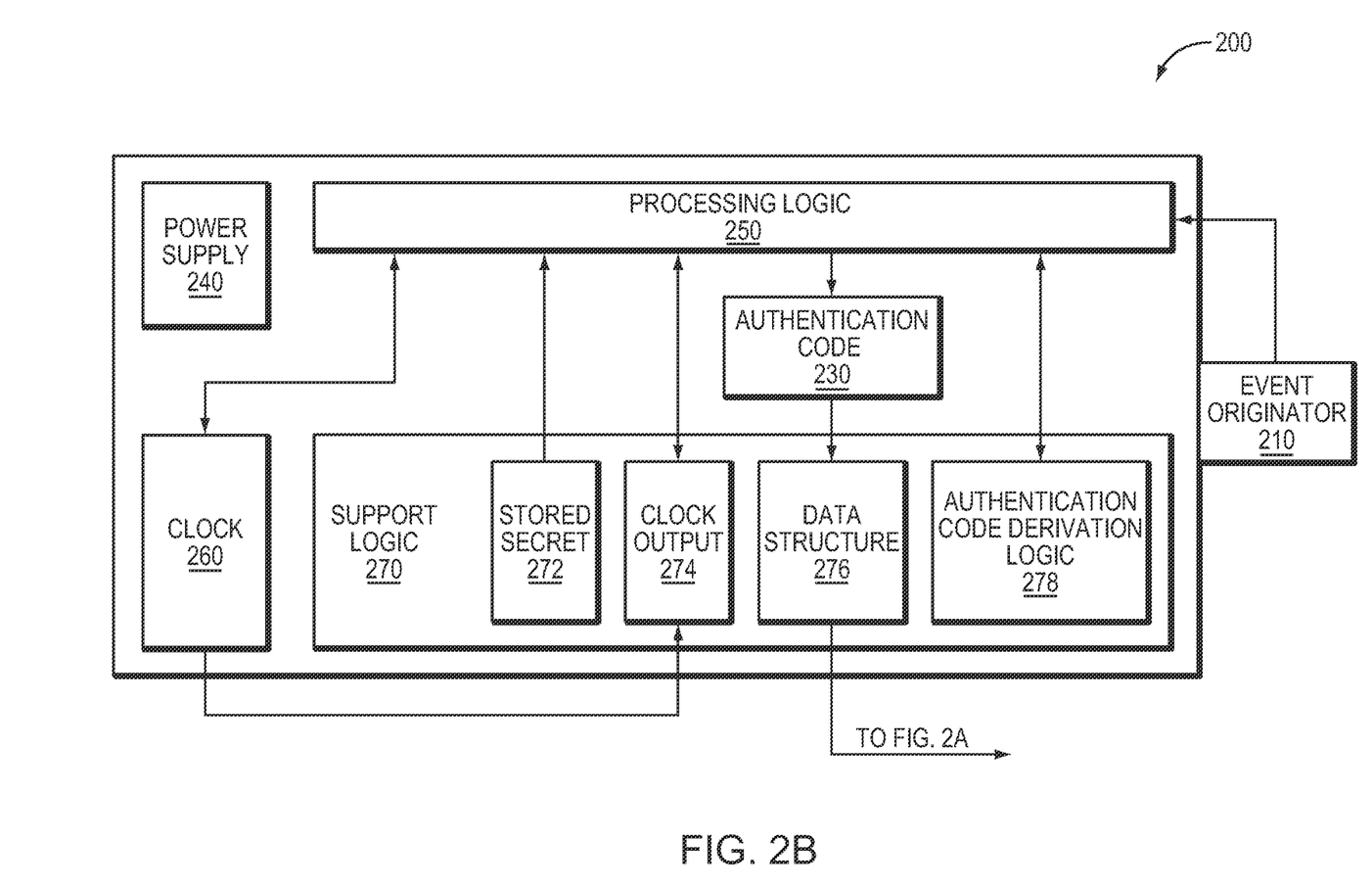

As illustrated in FIGS. 2A and 2B and as described above, one embodiment of the entity authentication device 120 is a key fob 200. The characteristics of the key fob 200 as described below are not limited to this specific embodiment, but may also be implemented in other embodiments of the entity authentication device 120. The key fob 200 determines authentication codes 230 by utilizing processing logic 250 wherein authentication code derivation logic 278 determines the next authentication code 230 to be displayed on the key fob display 220 (such as the displays described above for the output interface of the entity authentication device 120) based on the current state of the key fob 200. The processing logic 250 is typically firmware embedded on a controller within the key fob 200; however, depending on the particular embodiment and implementation, the processing logic may be, for example, a central processing unit or a microprocessor.

The current state of the key fob, or any other embodiment of the entity authentication device 120, may be represented in any of a number of ways. The current state of the device 120 may be represented by a stored secret 272 and a dynamic variable. The stored secret 272 as implemented in one specific implementation may be a unit of information such as a numerical value that is uniquely associated with, and typically manufactured into, the device 120. The dynamic value is usually a unit of information such as a hexadecimal or decimal numerical value that changes over time. The dynamic value is uniquely associated with a particular time interval demarcated by a particular starting time and ending time. Depending on the implementation, the time interval may or may not be pre-determined and is not required to be of any particular length nor is every time interval required to be the same length. The only requirement is that the time interval schedule be effectively synchronized between the device 120 and the verification computer 140. Methods that may be used to synchronize the device 120 and the verification computer 140 are described in U.S. Pat. No. 4,885,778 (the "Synchronization Patent"), which is hereby incorporated herein by reference in its entirety. The authentication code derivation logic 278 then uses the stored secret 272 and the dynamic value (which in the key fob 200 embodiment described, is the current time interval in accordance with the key fob's clock 260) to determine the non-predictable authentication code 230. More information on determining authentication codes can be found in U.S. Pat. No. 4,720,860 (the "Determining Authentication Codes Patent"), which is hereby incorporated herein by reference in its entirety.

A key fob 200 may be implemented any of a number of ways. The key fob 200 as illustrated in FIG. 2A and FIG. 2B is powered by an onboard power supply 240. The key fob 200 may also supply support logic 270, wherein at least some of at least the following may originate: a stored secret 272, a clock output 274, data structures 276 (where the authentication code(s) 230 may be stored), and the authentication code derivation logic 278. (In FIG. 2B, an arrow is shown emanating from structure 276 to signify that the display 220 of fob 200 is derived from structure 276.) The support logic 270 within the key fob 200, or any other entity authentication device 120, may be implemented in any of a number of ways including without limitation, disk storage, RAM, flash memory, or any combination of two or more of the above.

The key fob 200 may also provide an event originator 210 to allow the entity 110 to interact with the key fob 200. In one embodiment, the event originator 210 may be implemented as a button. In another embodiment the event originator 210 may be a microphone with speech recognition capabilities. In still another embodiment, the event originator 210 may be a smart card with the ability to communicate with a host, e.g. a computer. Other sizes, shapes, and implementations of the event originator 210 are possible without departing from the spirit of the invention. The event originator 210 may also be implemented within other embodiments of the entity authentication device 120 such as those described above. Additionally, the event originator may be implemented within an embodiment of the communications terminal 130, or within the communications terminal's 130 user interface. The utility of the event originator 210 is described in further detail below.

Figure 3:
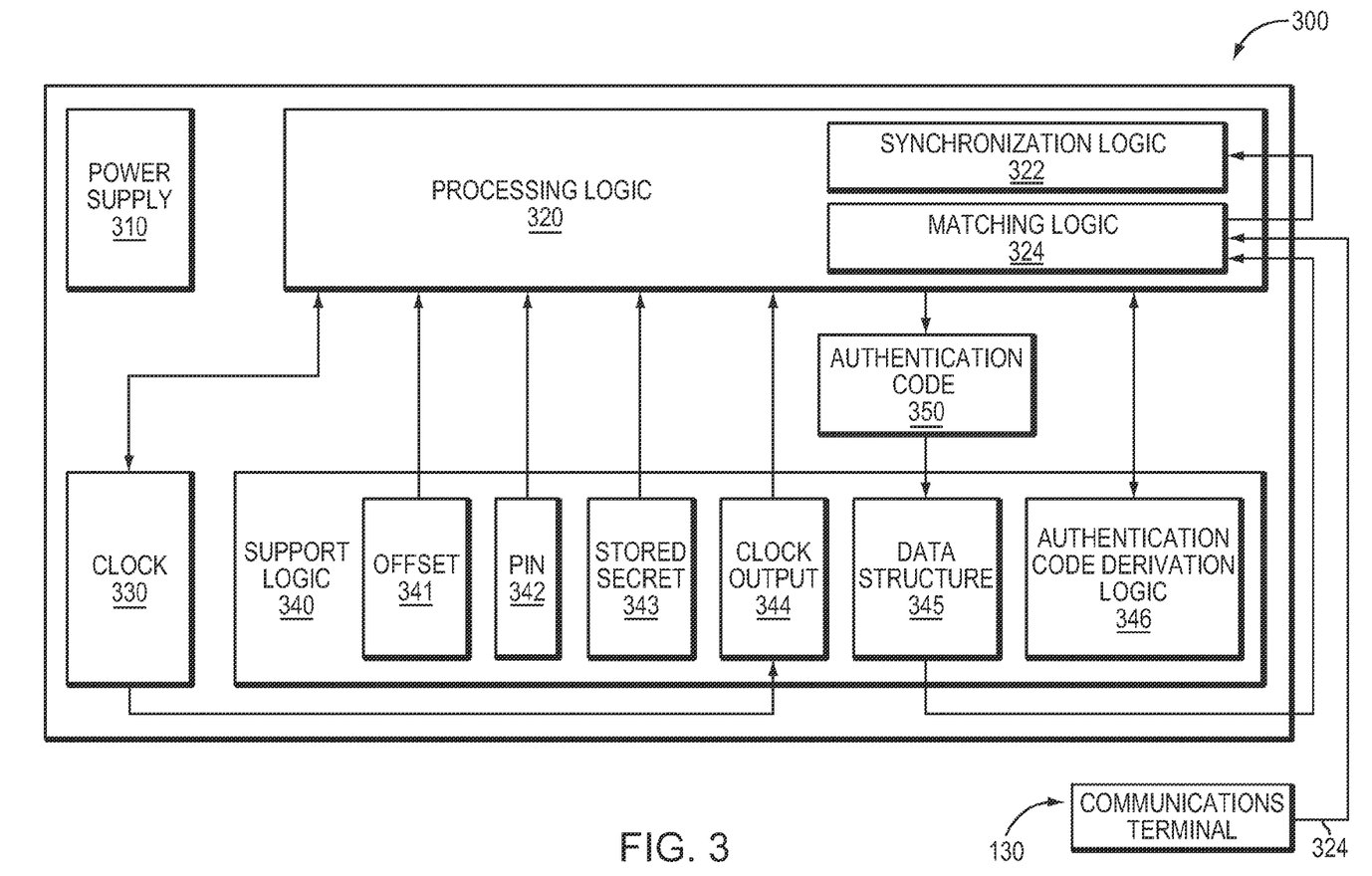

FIG. 3 illustrates a server 300, a specific embodiment of a verification computer 140. The server 300, and all other embodiments of the verification computer 140, are not limited to the characteristics described below but may be implemented in any of a number of ways. Also, the characteristics of the server 300 as described below are not limited to this specific embodiment, but may also be implemented in other embodiments of the verification computer 140 such as a personal computer or any other embodiment of the verification computer 140 which provides the functionality described below. The server 300 ultimately provides at least some of the same functionality as the key fob 200 entity authentication device 120 embodiment described above. Like the key fob 200, the server 300 determines authentication codes 350 by utilizing processing logic 320 wherein authentication code derivation logic 346 determines the next authentication code 350 based on the current state of the server 300. The current state of the server 300, or any other embodiment of the verification computer 140, may be represented in any of a number of ways. Like the key fob 200, the current state of the server 300 may be represented by a stored secret 343 and a dynamic variable as described for the key fob 200 above.

The server 300 as illustrated in FIG. 3 is powered by one or more forms of a power supply 310. The server 300 may also supply support logic 340 similar to that described above for the key fob 200, wherein at least some of at least the following may originate: the stored secret 343, a clock output 344, data structures 345 (where the authentication code(s) 350 may be stored), and the authentication code derivation logic 346. Additionally, the support logic 340 of the server 300 may contain an offset 341 value which is used to aid in synchronization, as described in the Synchronization Patent, and a PIN value 342 which may be used for an additional means for authenticating the entity 110, 110' as described above. The server 300 may also provide matching logic 324 and synchronization logic 322 for aiding in the authentication of the entity 110, 110' and for synchronization between the entity authentication device 120 and the server 300 as described in the Determining Authentication Codes Patent.

Figure 4:
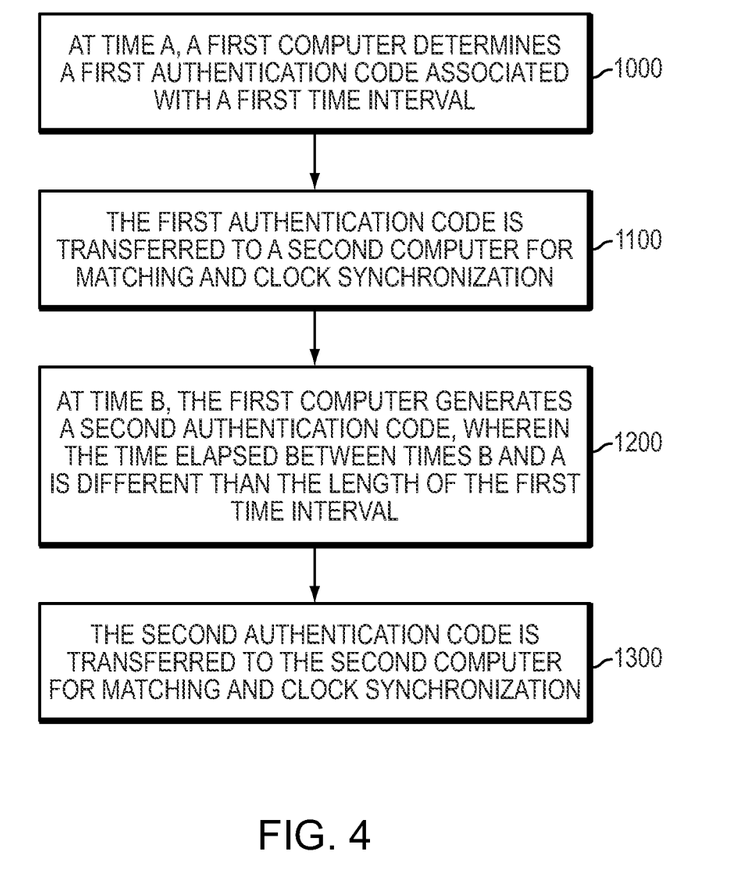
Figure 5A:
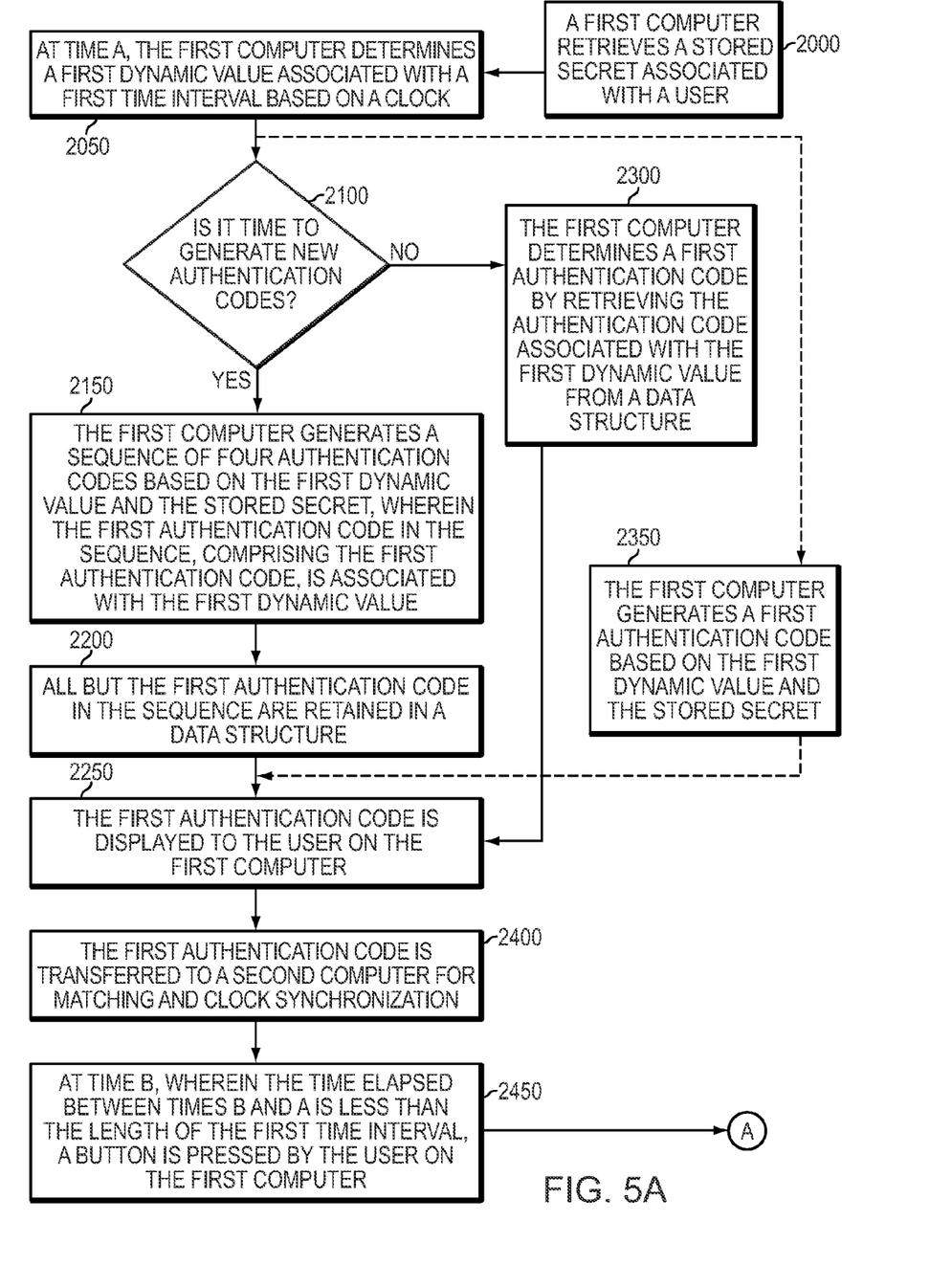
Figure 5B:
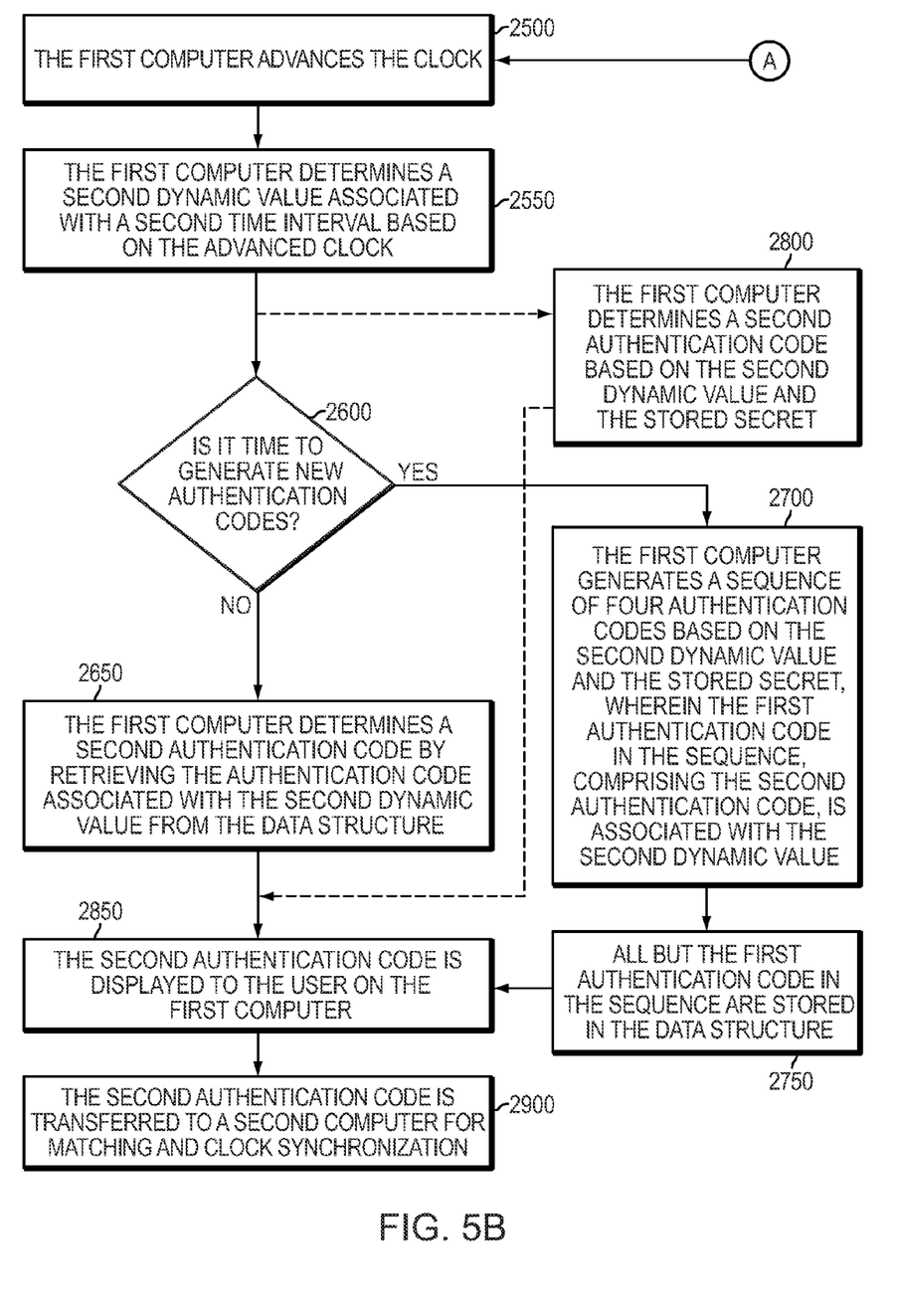
Figure 6A:
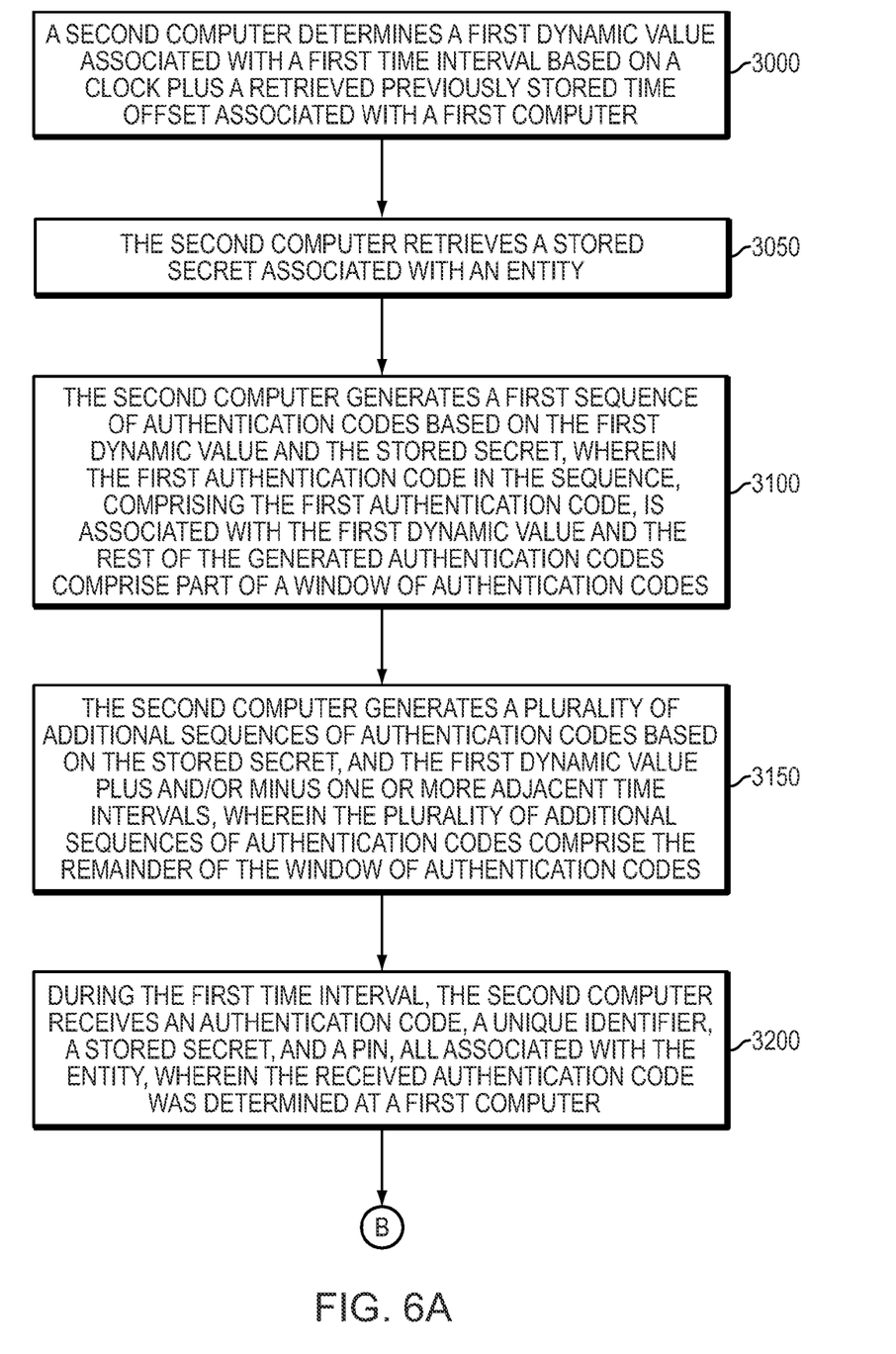
Figure 6B:
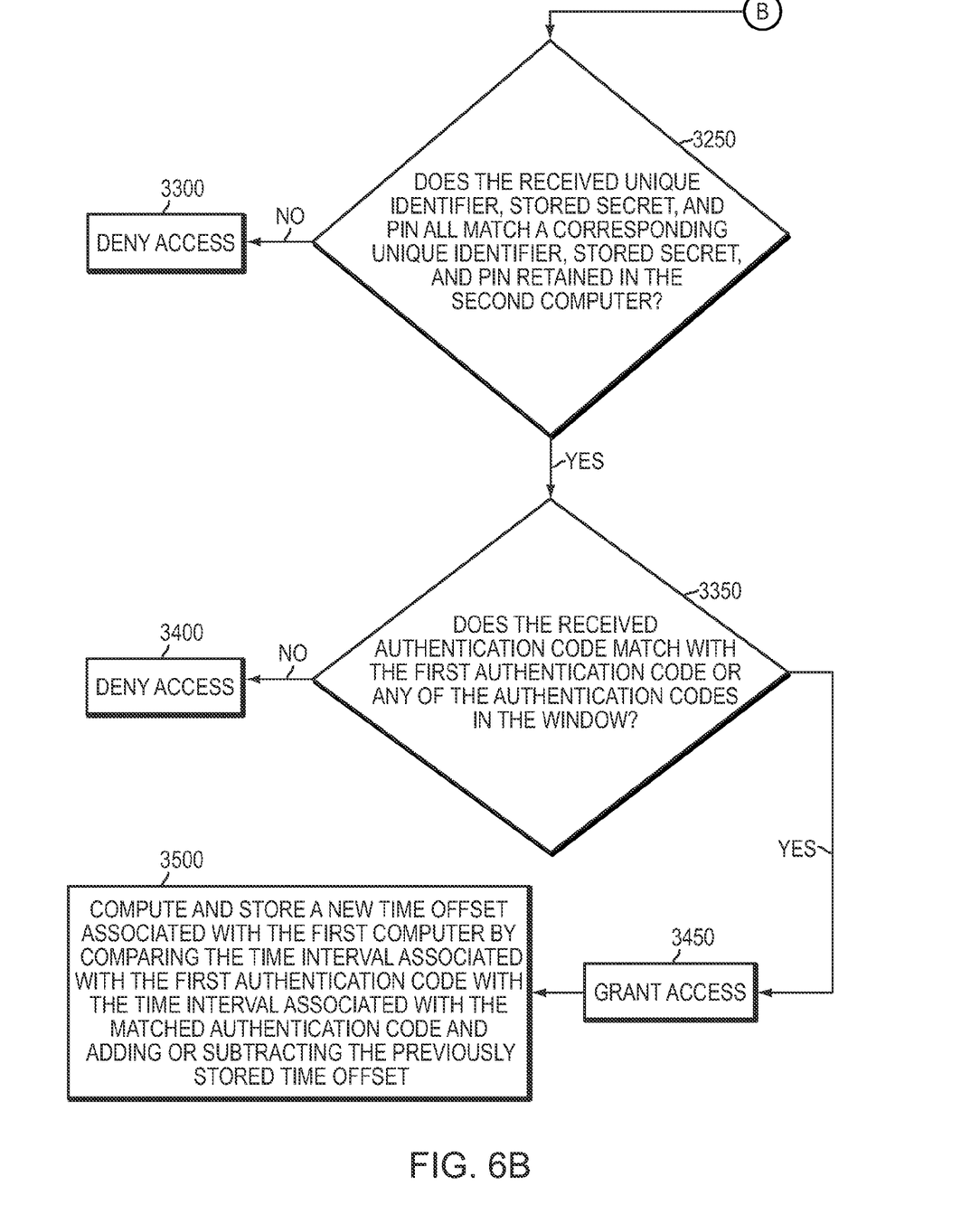

For explanation purposes, the discussion which follows with reference to FIGS. 4, 5 and 6 assumes that the key fob 200 as detailed above and illustrated in FIGS. 2A and 2B is an embodiment of the entity authentication device 120 (the first computer), and that the server 300 as detailed above and illustrated in FIG. 3 is an embodiment of the verification computer 140 (the second computer). Therefore, the authorization technique is not limited to the embodiments described below, but may be implemented in any of a number of embodiments of the entity authentication device 120 and the verification computer 140.

In at least one implementation of the authorization technique, as shown in high level form in FIG. 4, a first computer, in this example a key fob 200, at a first point in time, determines a first authentication code 230 associated with a first time interval in accordance with a clock 260, step 1000. This is accomplished by using the authentication code derivation logic 278 and the current state of the key fob 200 as described above. The first authentication code 230 is then transferred to a second computer, in this example a server 300, for matching and clock synchronization, step 1100, by using the server's 300 matching logic 324 and synchronization logic 322.

At a second point in time, the key fob 200 determines a second authentication code 230 as done in step 1100 for determining the first authentication code, wherein the time elapsed between the second point in time and the first point in time is different than the length of the first time interval, step 1200. In other words, the second authentication code 230 is determined before or after the end of the first time interval. The second authentication code 230 is then transferred to the server 300 for matching and clock synchronization, step 1300, as done in step 1100. Transferring of the second, and the first, authentication codes may be accomplished by use of a variety of connections such as those described above for the communication channel 118 between the communications terminal 130 and the verification computer 140.

Now described is a more detailed description of an implementation of the authorization technique. With reference to FIG. 5, an entity 110, 110' uses a first computer such as a key fob 200 to determine an authentication code 230 by first retrieving a stored secret 272 associated with, and unique to, the entity 110, 110', step 2000. The key fob 200 then determines, at a first point in time, a first dynamic value associated with a first time interval in accordance with a clock 260, step 2050. This dynamic value may be directly input into the processing logic 250 and/or it may be retained as a clock output 274 within the support logic 270. The dynamic value and the stored secret may then be used to determine the next authentication code as described in more detail below.

Authentication codes may be determined or generated in any of a number of implementations. Specific details regarding the generation of authentication codes are discussed in the Determining Authentication Codes Patent referenced above. The number of authentication codes generated may also vary depending on the specific implementation of the authorization technique. In one implementation, only one authentication code may be generated based on the stored secret and the first dynamic value, step 2350. This generated authentication code is then displayed to the entity 110 on the key fob's display 220, step 2250. This particular implementation would require at least a new dynamic value to determine a new authentication code.

In another implementation of the authorization technique, more than one authentication code may be generated based on the stored secret and the first dynamic value. For example, the authentication code derivation logic 278 utilized within the processing logic 250 of the key fob 200 may output a 128-bit value based on the stored secret and the first dynamic value. The 128-bit value may then be decimalized, truncated and then parsed into a number of individual authentication codes depending on the particular implementation. For instance, the 128-bit value may be decimalized and truncated before being parsed into a sequence of four 32-bit authentication codes. The first 32-bit authentication code is associated with the first dynamic value that was used to generate the 128-bit value, step 2150, and is presented on the key fob's display 220, step 2250. Depending on the specific implementation, any of the four 32-bit authentication codes may be chosen to associate with the first dynamic value. In other implementations, the chosen authentication code may be computed. The only requirement, preferably, is that the server 300 choose an authentication code in the same manner when generating sequences of authentication codes to avoid unnecessary synchronization problems. The three remaining authentication codes may then be retained in a data structure 276 for later use and will be associated with subsequent dynamic values, step 2200.

In this specific implementation, the key fob 200 may need to check whether any authentication codes have been retained in the data structure 276 before generating new authentication codes, step 2100. If no authentication codes have been retained, the key fob generates a series of four authentication codes based on of the stored secret 272 and the first dynamic value as described above in step 2150. If there are retained authentication codes, the key fob 200 retrieves one of the authentication codes in the data structure rather than generating a new series of authentication codes. Which authentication code is actually chosen may vary depending on the specific implementation of the authorization technique. This chosen value is in effect associated with the first dynamic value, step 2300, and displayed on the key fob's display 220.

Once the first authentication code is determined based on one of the implementations described above, the authentication code is transferred to a second computer, in this case a server 300, for matching and clock synchronization, step 2400, as described in more detail below.

At a second point in time, an event originator 210 on the key fob 200 is triggered, wherein the time elapsed between the first point in time and the second point in time is less than the length of the first time interval, step 2450. In this specific example, the event originator 210 may be a button that can be depressed by a user; however, as stated above, the event originator 210 may be implemented in any of a number of ways. Additionally, the event originator and its characteristics are not limited to this particular embodiment of the entity authentication device 120.

Once the user depresses the button 210 on the key fob 200, the clock 260 within the key fob 200 is advanced to a second time interval, step 2500. Alternatively, instead of advancing the clock 260 directly, a stored clock value 274 within the key fob's support logic can be advanced. Significantly, other clock altering implementations are possible without departing from the authentication technique described herein. For example, the clock or stored clock value may be altered to a time in the past. Additionally, the clock or stored clock value may be advanced, or altered to a time in the past by, e.g., a designated time interval, a computed time interval, or an incremental time interval. With respect to the computed time interval, for example, the interval changes from authentication to authentication, but is determinable by the server. As an example, the token may take the last digit of the time (e.g., "7", if the time is 12:57) and use this last digit to extract a particular digit (e.g., the seventh digit) of the seed value (e.g., "3") and the token could jump a number of time intervals corresponding to the value of that particular digit (e.g., by jumping three time intervals). This may appear random to an attacker or observer, but is determinable by the server.

Once the key fob's 200 button 210 is depressed, the key fob 200 determines a second dynamic value associated with the second time interval in accordance with the altered clock 260 or altered clock value 274 which is stored in the key fob's support logic 270, step 2550. As may be done at step 2100, the key fob 200 may then check to determine whether there are any retained authentication codes in the data structure 276, step 2600. If there are no authentication codes in the data structure 276 the key fob 200 generates a new sequence of four authentication codes based on of the stored secret 272 and the second dynamic value, wherein the first authentication code in the sequence is associated with the second dynamic value, step 2700. The three remaining authentication codes are then retained in the data structure for later use, step 2750. At step 2600, if it determined that at least one authentication code is retained in the data structure, the key fob 200 retrieves the at least one authentication code, step 2650, instead of generating a new series of authentication codes. The retrieved authentication code is in effect, associated with the second dynamic value.

Alternatively, if the specific implementation of the authorization technique only generates one authentication code at a time, the key fob 200 only generates a second authentication code based on the second dynamic value and the stored secret, step 2800, rather than checking a data structure to determine whether or not to generate a new series of authentication codes or to retrieve an authentication codes.

Once an authentication code is determined, it is displayed to the user on the key fob's 200 display 220, step 2850. The authentication code is then transferred to a second computer, in this case the server 300, for matching and clock synchronization, step 2900, as done in step 2400 for the first authentication code.

The verification computer 140, in this case the server 300, mimics at least a substantial portion of the key fob's 200 functionality. With reference to FIG. 6, as with the key fob 200, authentication codes 350 are generated based on the state of the server 300, which may be represented by a dynamic value associated with a first time interval based on a clock 330 or stored clock value 344, step 3000, and a retrieved stored secret 343 associated with the user, step 3050. Significantly, the server 300 uses a stored time offset 341 value, which was determined during the last synchronization of the server 300 and key fob 200 as done at step 3500 below, to accurately determine the correct time interval to use in authentication code generation, step 3000. These values are then used to determine one authentication code or a sequence of authentication codes, depending on the specific implementation, as done for the key fob 200 and as described in detail in the Synchronization Patent, step 3100.

If a sequence of authentication codes is generated, one of the generated authentication codes is chosen to correspond to the first dynamic value, step 3100. Preferably, the server 300 chooses the authentication code in the same manner as the key fob 200 to avoid unnecessary synchronization problems as described above for the key fob 200. The remaining authentication codes are then retained in the server's 300 support logic 340, for instance, within a data structure 345. The server 300 may then generate a plurality of additional sequences of authentication codes based on the stored secret 343, and the first dynamic value plus and/or minus one or more adjacent time intervals. These additional authentication codes are then retained among the remaining authentication codes of the sequence of authentication codes generated at step 3100, step 3150.

All of the retained authentication codes comprise a window of authentication codes ("the window"). The window allows the server 300 to authenticate an entity even if the expected authentication code—the authentication code associated with the first time interval—is not received by the server 300. Typically, the window extends to time intervals before and beyond the expected authentication code. Therefore, the server 300 is able to accommodate for synchronization errors, user-related errors (such as delayed authentication code entry), and most important for the discussion herein, button presses. The total size of the window, as well as its symmetric or asymmetric disposition in relation to the expected authentication code, depends on the specific implementation.

In an example, an asymmetric window may occur with a token in which a button press only advances a time value forward. In this situation, the server only examines a small window of codes before the expected code as needed to accommodate synchronization or user-related errors. On the other hand, the server examines a larger window of codes after the expected code as needed to accommodate synchronization or user-related errors plus accommodating button presses. Maintaining asymmetric windows in this case helps to defeat replay attacks while preserving the ability to support button initiated advancements of the authentication codes.

When an authentication code is sent to, and received by, the server 300, additional information may be sent with the authentication code, step 3200. Typically this may include, without limitation, one or more of the following: a unique identifier, such as a username or a device identification number; a stored secret; and a PIN value. In other implementations, the stored secret and the unique identifier may be one and the same. Furthermore, as explained above and in the Generation Value Patent, one or more of these values may be added to the authentication code before transfer. All of the information that is received by the server 300 in addition to the authentication code is then used for initial authentication purposes.

First, the server 300 determines whether the unique identifier exists by checking a library of authorized unique identifiers stored in the server's 300 support logic 340, step 3250. If the server 300 is not able to locate the unique identifier, the entity 110, 110' is denied access, step 3300. Preferably, if the unique identifier is located, the server 300 then separately compares the stored secret against a library of authorized stored secrets, and optionally the PIN against a library of authorized PIN values, also located in the server's 300 support logic 340, step 3250. The location and storage of the libraries may be within the server's 300 data structures 345 or other memory allocations within the server's 300 support logic 340 depending on the specific implementation. Once the stored secret and the PIN are verified, the server 300 determines whether or not the transferred authentication code is correct, step 3350. If the stored secret and optionally the PIN are not verified, the entity 110, 110' is denied access, step 3300.

The server 300 then compares the received authentication code with the expected authentication code and the window of authentication codes to determine whether there is a match, step 3350. If the key fob 200 and the server 300 are generating an authentication code based on, for example, the same one-minute time interval, and the key fob's 200 authentication code is transmitted during that same time interval, the authentication code the server 300 receives should match the expected authentication code generated by the server 300. However, several conditions may occur to cause an authentication code that is not expected to be received by the server 300. For instance, user delay, the key fob's 200 and server's 300 clocks are not in sync, or the key fob's 200 button is pressed resulting in a clock 260 alteration as described previously.

Lastly, assuming that a button press on a key fob 200 that generates authentication codes based on one-minute time intervals advances the key fob's 200 clock 260 by one minute, each button press would result in an authentication code associated with a time interval after the expected authentication code's time interval. In other words, the received authentication code would fall within the window of authentication codes unless the number of button presses results in an authentication code outside the window. In one implementation, generating and presenting authentication codes to the user that fall outside the window may be avoided by limiting the number of button presses.

Figure 7A:
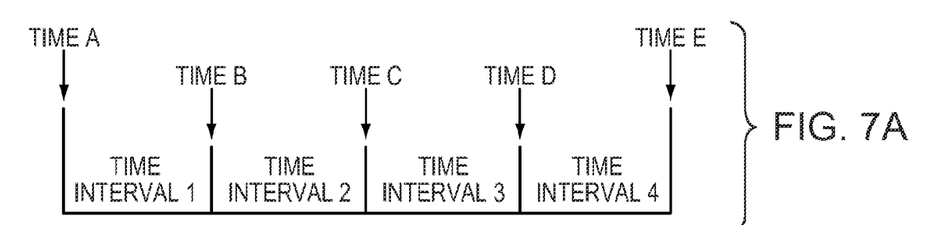
FIG. 7 is a diagram showing time intervals that may be used with the embodiments of FIGS. 1-3 and the flowcharts of FIGS. 4-6B.
Figure 7B:
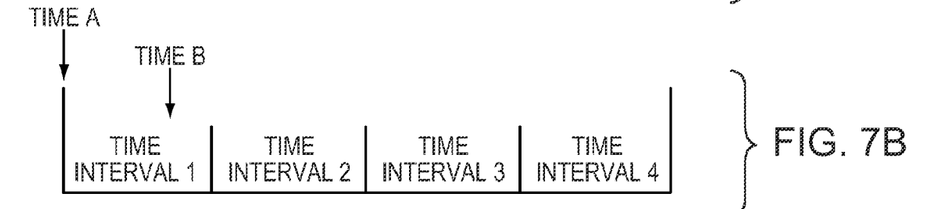
Figure 7C:
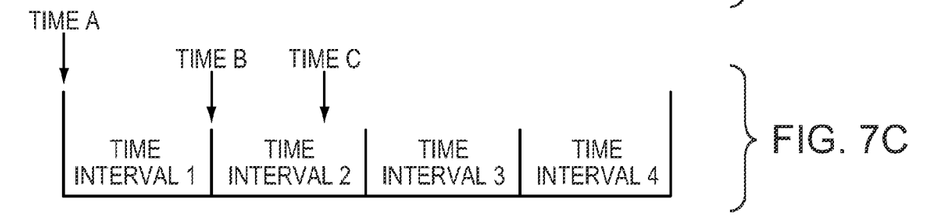
Figure 7D:
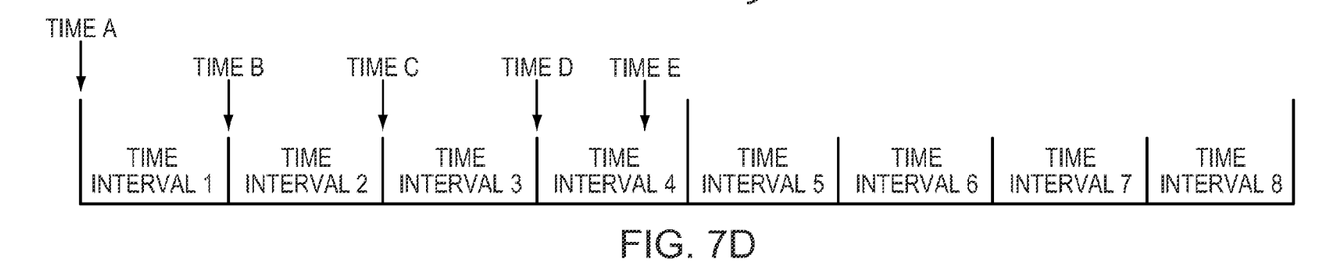

FIGS. 7A-7D illustrate scenarios in accordance with one or more implementations of the authentication technique. FIG. 7A illustrates that absent an event occurrence, at points in time indicated as TIME A, B, C, D, E, the key fob displays or otherwise makes authentication codes available such that the amount of time between each consecutive pair of points in time is equal to the length of the time interval corresponding to the first point in the pair. FIGS. 7B-D illustrate that if an event occurs during a time interval, e.g., interval 1 in FIG. 7B, the key fob can display or otherwise make a new authentication code available at a point in time, e.g., TIME B, that is before the end of the first time interval, i.e., that is displaced from TIME A by a length of time that is less than the length of the first interval.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for use in generating an authentication code associated with an entity, the method comprising:
retrieving a stored secret associated with an entity;
at a first point in time after a first time interval, determining a first dynamic value associated with the first time interval;
determining a first authentication code based on the first dynamic value;
at a second point in time, determining a second dynamic value associated with a second time interval, wherein the first and second dynamic values are based on a clock;
determining a second authentication code based on the second dynamic value, wherein determining the second authentication code is triggered by an event occurring prior to the end of the first time interval, wherein the amount of time between the first and second points in time is less than the length of the first time interval, wherein the event is initiated by a user; and
wherein the first and second authentication codes are derived by an entity authentication device from the stored secret.

2. The method of claim 1 further comprising:
altering a clock;
wherein the second dynamic value is based on the clock.

3. The method of claim 1 further comprising:
altering a clock output;
wherein the second dynamic value is based on the clock output.

4. The method of claim 1 further comprising:
advancing a clock;
wherein the second dynamic value is based on the clock.

5. The method of claim 1 further comprising:
advancing a clock output;
wherein the second dynamic value is based on the clock output.

6. The method of claim 1 wherein the first and second time intervals are the same length.

7. The method of claim 1 wherein at least one of the determinations of the first and second authentication codes avoids use of the stored secret.

8. The method of claim 1 wherein at least one of the first and second authentication codes is retrieved from a data structure that comprises a plurality of authentication codes.

9. The method of claim 1 wherein at least one of the determinations of the first and second authentication codes is further based on the stored secret.

10. The method of claim 1, wherein the event is caused by the entity.

11. The method of claim 1, wherein the event is a button press.

12. The method of claim 1 further comprising:
updating a display based on at least one of the first and second authentication codes.

13. A system for use in generating an authentication code associated with an entity, the system comprising:
first logic retrieving a stored secret associated with an entity;
second logic, at a first point in time after a first time interval, determining a first dynamic value associated with the first time interval;
third logic determining a first authentication code based on the first dynamic value;
fourth logic, at a second point in time, determining a second dynamic value associated with a second time interval, wherein the first and second dynamic values are based on a clock;
fifth logic determining a second authentication code based on the second dynamic value, wherein determining the second authentication code is triggered by an event occurring prior to the end of the first time interval, wherein the amount of time between the first and second points in time is less than the length of the first time interval, wherein the event is initiated by a user; and
wherein the first and second authentication codes are derived by an entity authentication device from the stored secret.

* * * * *